(12) United States Patent
Wang et al.

(10) Patent No.: US 8,096,545 B2
(45) Date of Patent: Jan. 17, 2012

(54) SHEET-FEEDING SCANNING APPARATUS HAVING MECHANISM FOR FEEDING BUSINESS CARD

(75) Inventors: Chung-Kai Wang, Taipei (TW); Wei-Hsun Hsu, Taipei (TW); Wen-An Huang, Taipei (TW); Chao-Min Yang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 299 days.

(21) Appl. No.: 12/205,454

(22) Filed: Sep. 5, 2008

(65) Prior Publication Data

US 2010/0007931 A1 Jan. 14, 2010

(30) Foreign Application Priority Data

Jul. 11, 2008 (TW) ................. 97126234 A

(51) Int. Cl.
*B65H 5/26* (2006.01)
*B65H 1/00* (2006.01)
*G03G 15/00* (2006.01)

(52) U.S. Cl. ....... 271/9.09; 271/9.01; 271/162; 399/392
(58) Field of Classification Search ................. 271/3.14, 271/9.01, 9.02, 9.09, 162; 399/392, 391
See application file for complete search history.

(56) References Cited

U.S. PATENT DOCUMENTS

| | | | | |
|---|---|---|---|---|
| 4,350,329 A * | 9/1982 | Holzhauser et al. | ......... | 271/9.09 |
| 4,523,752 A * | 6/1985 | Kigawa et al. | ............... | 271/9.02 |
| 5,704,605 A * | 1/1998 | Yasuoka | ....................... | 271/9.02 |
| 5,823,522 A * | 10/1998 | Fujiwara et al. | ............. | 271/4.08 |
| 6,088,135 A * | 7/2000 | Kusumoto | .................... | 358/498 |
| 6,233,068 B1 * | 5/2001 | Kondo | .......................... | 358/498 |
| 6,612,561 B2 * | 9/2003 | Sekine | ......................... | 271/3.14 |
| 6,738,167 B1 * | 5/2004 | Suzuki | .......................... | 358/498 |
| 6,836,624 B2 * | 12/2004 | Suzuki | ............................ | 399/44 |
| 7,338,043 B2 * | 3/2008 | Sorenson et al. | ............. | 271/162 |
| 7,668,501 B2 * | 2/2010 | Murakami et al. | ............ | 399/392 |
| 7,806,397 B2 * | 10/2010 | Wang et al. | .................... | 271/9.09 |
| 7,971,866 B2 * | 7/2011 | Huang et al. | ................. | 271/9.01 |
| 2002/0056957 A1 * | 5/2002 | Sekine | ......................... | 271/3.14 |
| 2009/0315247 A1 * | 12/2009 | Wang et al. | .................... | 271/3.15 |
| 2010/0014128 A1 * | 1/2010 | Huang et al. | .................. | 358/498 |

* cited by examiner

*Primary Examiner* — Kaitlin Joerger
*Assistant Examiner* — Patrick Cicchino
(74) *Attorney, Agent, or Firm* — Kirton & McConkie; Evan R. Witt

(57) ABSTRACT

A sheet-feeding scanning apparatus having a business card feeding mechanism is provided. The sheet-feeding scanning apparatus includes a scanning module, an ordinary document input tray, an ordinary document pick-up roller assembly, a transfer channel, a plurality of transfer rollers, an ejecting tray, an ejecting roller assembly, a business card input tray, and a business card pick-up roller assembly. The business card input tray includes a business card support plate, a spring, a separation slice and a position-limiting glide slot. The business card pick-up roller assembly includes a business card pick-up roller, a business card separation roller and a shaft rod. The shaft rod is sheathed by the business card separation roller. The sheet-feeding scanning apparatus is adapted for scanning images of multiple ordinary documents or multiple business cards.

2 Claims, 4 Drawing Sheets

SHEET-FEEDING SCANNING APPARATUS HAVING MECHANISM FOR FEEDING BUSINESS CARD

FIELD OF THE INVENTION

The present invention relates to a scanning apparatus, and more particularly to a sheet-feeding scanning apparatus having a mechanism for feeding business cards or ordinary documents.

BACKGROUND OF THE INVENTION

Scanning apparatuses are widely used for scanning images of documents, photographs or films. The scanned images can be converted into electronic files, which are then stored, processed or spread. With increasing development of scanning technologies, the scanning apparatuses have experienced great growth and are now rapidly gaining in popularity.

In the early stage, the scanning apparatus can scan one side of the document. For scanning both sides of the document, after one side of the document has been scanned, the document should be manually turned over so as to scan the other side of the document. However, the process of manually turning over the document is troublesome. Recently, an automatic document feeder is usually integrated into the scanning apparatus. After a stack of documents to be scanned are placed on the sheet input tray of the automatic document feeder, the sheet-feeding mechanism of the automatic document feeder will successively transport the paper to perform the scanning operation without the need of manually turning over the documents. This means of automatically feeding the paper sheets is both time-saving and efficient. It is found that the scanning apparatuses are improved according to the generation development and the diverse demands.

On basis of business affairs' demand, business cards are frequently used to provide potential customers with a means to contact the business. After the business cards are accumulated to a large amount, the basic information associated with the business cards is manually searched. This manual searching approach is very troublesome. For a purpose of quickly searching the basic information associated with the business cards and saving the collecting space, the business cards are usually scanned as electronic files, which are then stored and managed. As known, the use of the conventional scanning apparatus to scan the business cards incurs drawbacks when both sides of a business card are scanned. In other words, after one side of the business card has been scanned, the business card should be manually turned over so as to scan the other side of the business card. The process of manually turning over the business card is troublesome especially when business cards are accumulated to a large amount. For convenience, the user prefers using a sheet-feeding scanning apparatus with the automatic document feeder to scan the business cards.

Generally, the sheet-feeding scanning apparatus with the automatic document feeder can scan general size of documents (e.g. A4-sized or Letter-sized documents) and thus the gap between the transfer roller assemblies thereof is designed to accommodate general size of documents. Since the business card has a size smaller than the general documents (also referred as ordinary documents in this context), the business card fed by the first transfer roller assembly fails to be nipped by the second transfer roller assembly and is usually stayed between these two transfer roller assemblies. In other words, the sheet-feeding scanning apparatus with the automatic document feeder is not applicable to scan business cards. Moreover, since the business card is relatively thicker than the general documents, the bending degree of the business card during transportation is usually insufficient.

Therefore, there is a need of providing a sheet-feeding scanning apparatus having a business card feeding mechanism so as to obviate the drawbacks encountered from the prior art.

SUMMARY OF THE INVENTION

It is an object of the present invention to provide a sheet-feeding scanning apparatus having a mechanism for feeding business cards or ordinary documents.

In accordance with an aspect of the present invention, there is provided a sheet-feeding scanning apparatus having a business card feeding mechanism. The sheet-feeding scanning apparatus is adapted for scanning images of multiple ordinary documents or multiple business cards. The sheet-feeding scanning apparatus includes a scanning module, an ordinary document input tray, an ordinary document pick-up roller assembly, a transfer channel, a plurality of transfer roller assemblies, an ejecting tray, an ejecting roller assembly, a business card input tray, and a business card pick-up roller assembly.

The scanning module is disposed within a scan region for scanning the images of the ordinary documents or the business cards. The ordinary document input tray is arranged at one side of the scanning module for placing the ordinary documents thereon. The ordinary document pick-up roller assembly is used for feeding the ordinary documents on the ordinary document input tray into an internal portion of the sheet-feeding scanning apparatus. The transfer channel is arranged between the ordinary document input tray and the scan region for leading the ordinary documents. The transfer roller assemblies are used for transporting the ordinary documents. The ejecting tray is used for supporting the ordinary documents or the business cards after being scanned. The ejecting roller assembly is used for transporting the ordinary documents or the business cards to the ejecting tray. The business card input tray is arranged at another side of the scanning module, and comprising a business card support plate for placing the business cards thereon. The business card input tray includes a spring disposed under the business card support plate for exerting an elastic force on the business card support plate. The business card pick-up roller assembly is fixed on the business card input tray for feeding the business cards on the business card input tray. An elastic force is exerted on the business card support plate when the business cards are placed on the business card support plate of the business card input tray, so that the business cards are clamped between the business card support plate and the business card pick-up roller assembly and only one of the business cards is fed into the transfer channel by the business card pick-up roller assembly for each time.

In an embodiment, the business card pick-up roller assembly includes a business card pick-up roller and a business card separation roller. The business card pick-up roller is used for feeding the business cards into the transfer channel. The business card separation roller offers a friction force on the business cards such that only one of the business cards is fed into the transfer channel by the business card pick-up roller assembly for each time.

In an embodiment, the business card pick-up roller assembly further comprises a shaft rod, which is pivotally coupled to the business card input tray, so that the business card input tray is rotated with respect to the shaft rod to be located in either a feeding position or a retracting position.

In an embodiment, the business card input tray further comprises a position-limiting glide slot, the business card pick-up roller assembly further comprises a business card pick-up roller shaft, and the business card pick-up roller shaft is sheathed by the business card pick-up roller and inserted into the position-limiting glide slot. The business card pick-up roller shaft is located in a first position of the position-limiting glide slot when the business card input tray is located in the feeding position. Whereas, the business card pick-up roller shaft is located in a second position of the position-limiting glide slot when the business card input tray is located in the retracting position.

In an embodiment, the business card input tray further comprises a separation slice for offering a friction force on the business cards such that only one of the business cards is fed into the transfer channel by the business card pick-up roller assembly for each time.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
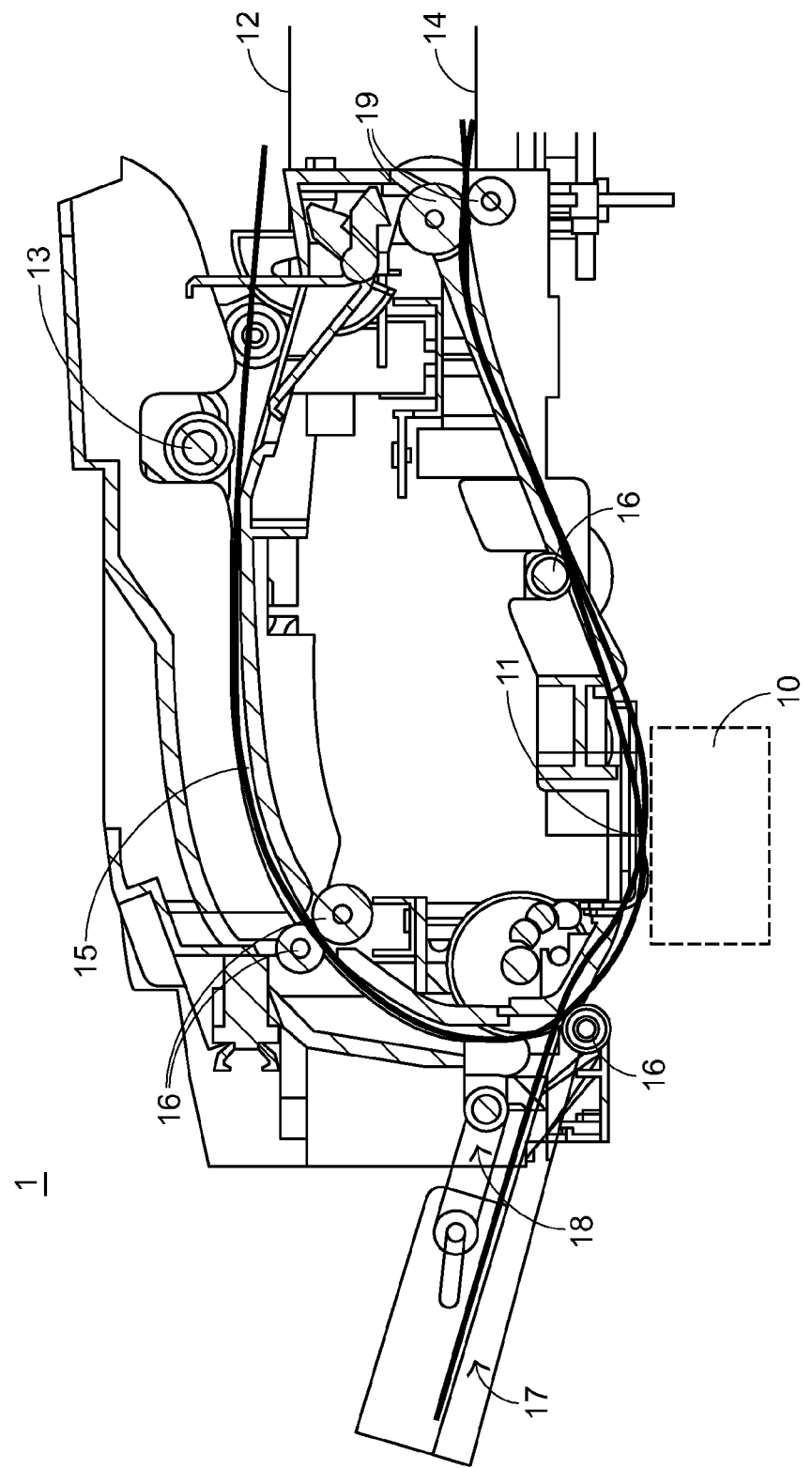
FIG. 1 is a schematic cross-sectional view illustrating a sheet-feeding scanning apparatus having a business card feeding mechanism according to a preferred embodiment of the present invention.

FIG. 1 is a schematic cross-sectional view illustrating a sheet-feeding scanning apparatus having a business card feeding mechanism according to a preferred embodiment of the present invention. As shown in FIG. 1, the sheet-feeding scanning apparatus 1 principally comprises a scanning module 10, an ordinary document input tray 12, an ordinary document pick-up roller assembly 13, an ejecting tray 14, a transfer channel 15, several transfer rollers 16, an ejecting roller assembly 19, a business card input tray 17 and a business card pick-up roller assembly 18. The scanning module 10 is disposed within a scan region 11 for scanning the images of multiple ordinary documents (not shown) or multiple business cards (not shown). With the scanning module 10 serving as a reference point, the ordinary document input tray 12 is arranged at one side of the scanning module 10 for placing thereon the ordinary documents to be scanned; and the business card input tray 17 is arranged at another side of the scanning module 10. The ordinary document pick-up roller assembly 13 is disposed in the vicinity of the ordinary document input tray 12 for feeding the ordinary documents on the ordinary document input tray 12 into the internal portion of the sheet-feeding scanning apparatus 1. The ejecting tray 14 is arranged below the ordinary document input tray 12 for supporting thereon the ordinary documents or the business cards after being scanned by the scanning module 10. The ejecting roller assembly 19 is used for transporting the scanned ordinary documents or the scanned business cards to the ejecting tray 14. The transfer channel 15 is arranged between the ordinary document input tray 12 and scan region 11 for leading the ordinary documents or the business cards to the scan region 11. The transfer rollers 16 are arranged in the transfer channel 15 for transporting the ordinary documents or the business cards through the transfer channel 15.

Hereinafter, the process of scanning multiple ordinary documents by using the sheet-feeding scanning apparatus of the present invention will be illustrated with reference to FIG. 1. First of all, the ordinary documents to be scanned are placed on the ordinary document input tray 12. For scanning the ordinary documents, the ordinary documents are successively fed into the transfer channel 15 by the ordinary document pick-up roller assembly 13. Next, the ordinary documents are transported in the transfer channel 15 by the transfer rollers 16 to the scan region 11. When the ordinary documents are transported across the scan region 11, the scanning module 10 reads the images of these ordinary documents. After the ordinary documents are scanned by the scanning module 10, the ordinary documents are transported by the transfer roller 16 which is arranged between the scan region 11 and the ejecting tray 14 to the ejecting roller assembly 19. Next, the ordinary documents are transported by the ejecting roller assembly 19 and thus exited to the ejecting tray 14. Meanwhile, the scanning operations on the ordinary documents are completed.

Figure 2:
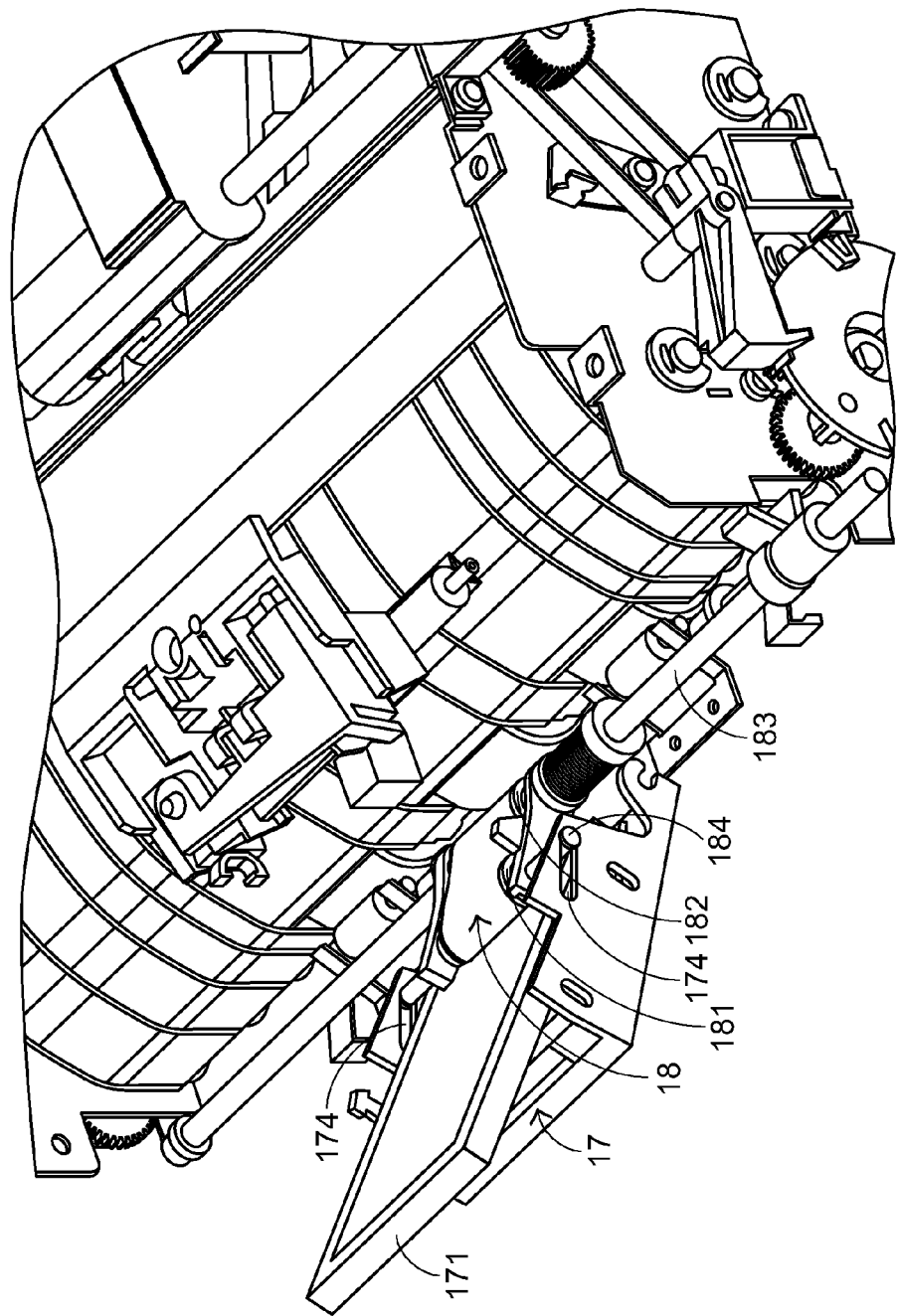
FIG. 2 is a schematic partial perspective view of the sheet-feeding scanning apparatus having a business card feeding mechanism according to the present invention.
Figure 3:
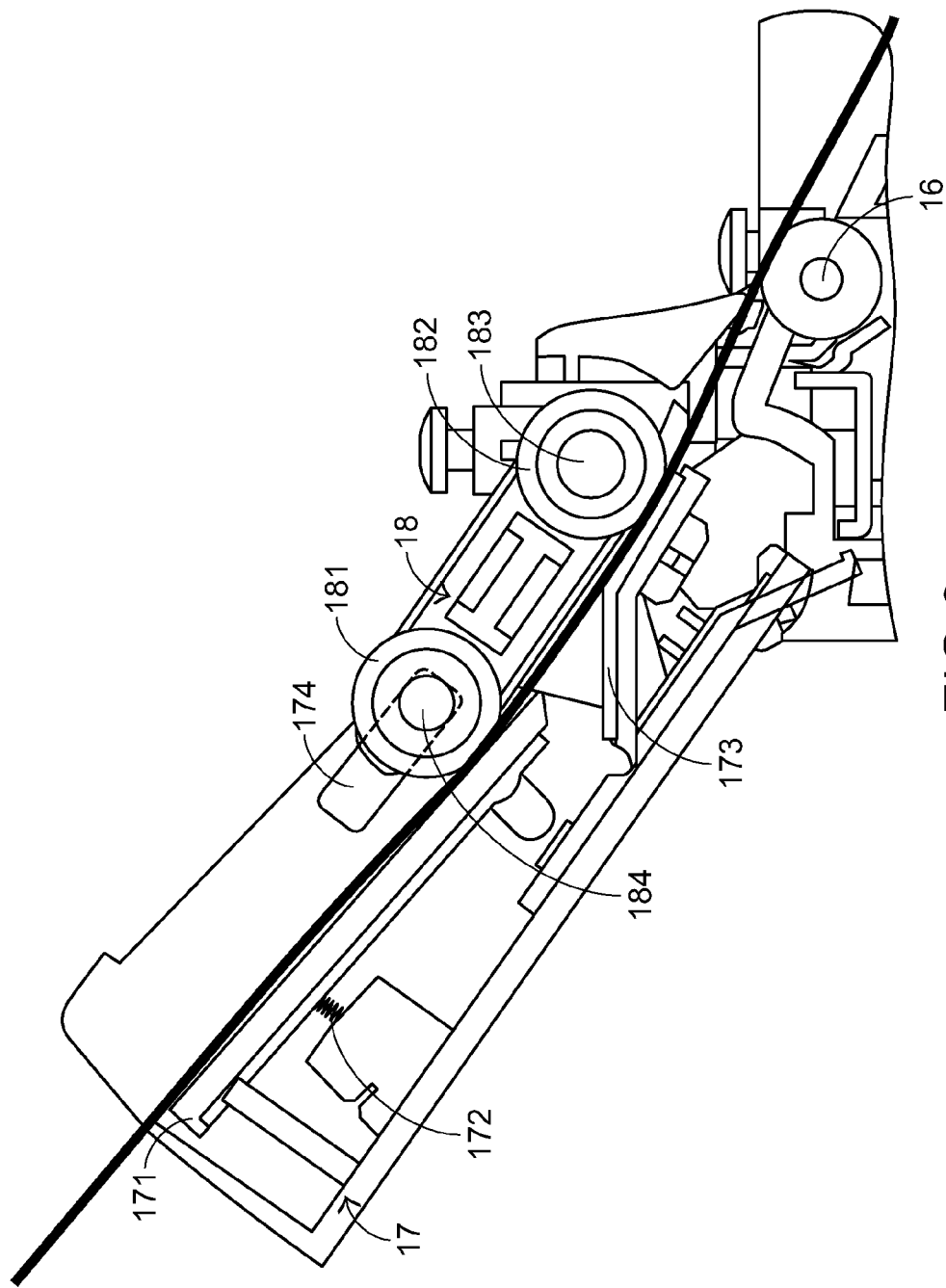
FIG. 3 is a schematic partial perspective view illustrating the business card input tray of the sheet-feeding scanning apparatus in a feeding position.

Hereinafter, the process of scanning multiple business cards by using the sheet-feeding scanning apparatus of the present invention will be illustrated with reference to FIGS. 2 and 3. FIG. 2 is a schematic partial perspective view of the sheet-feeding scanning apparatus having a business card feeding mechanism according to the present invention. FIG. 3 is a schematic partial perspective view illustrating the business card input tray of the sheet-feeding scanning apparatus in a feeding position. As shown in FIG. 3, the business card input tray 17 comprises a business card support plate 171, a spring 172, a separation slice 173 and a position-limiting glide slot 174. The business card support plate 171 is user for supporting the business cards thereon. The spring 172 is disposed under the business card support plate 171 for exerting an elastic force on the business card support plate 171. The business card pick-up roller assembly 18 is fixed on the business card input tray 17 for feeding the business cards placed on the business card input tray 17 into the internal portion of the sheet-feeding scanning apparatus 1. The business card pick-up roller assembly 18 comprises a business card pick-up roller 181, a business card separation roller 182, a shaft rod 183 and a business card pick-up roller shaft 184. The business card pick-up roller 181 may feed the business cards into the transfer channel 15 (as shown in FIG. 1). When the business card separation roller 182 is contacted with the business cards, the business card separation roller 182 offers a friction force on the business cards such that only one business card is separated from the stack of business cards and allowed to be fed into the transfer channel 15 by the business card pick-up roller assembly 18 for each time.

Figure 4:
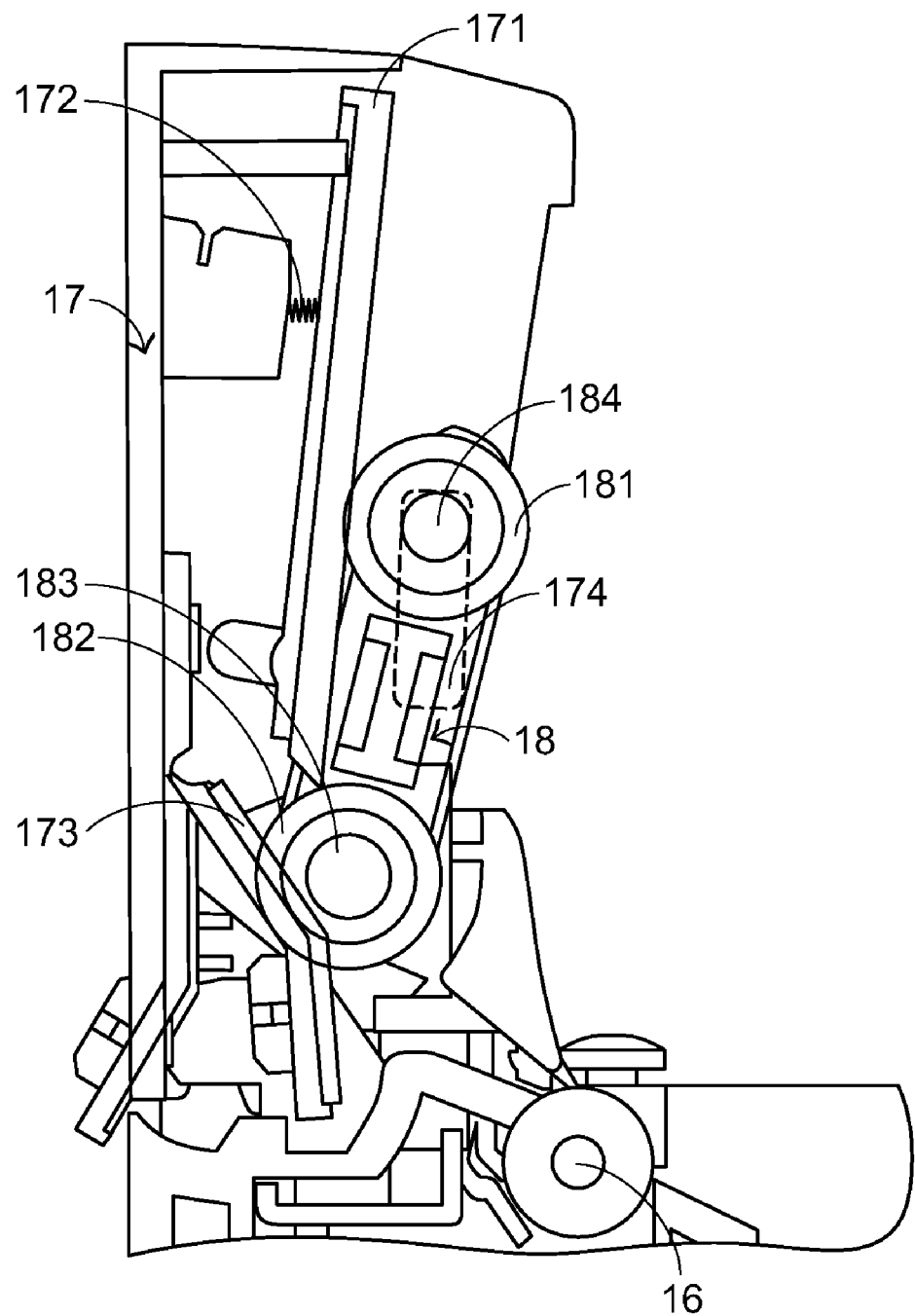
FIG. 4 is a schematic partial perspective view illustrating the business card input tray of the sheet-feeding scanning apparatus in a retracting position.

Please refer to FIG. 2. The shaft rod 183 is sheathed by the business card separation roller 182 and pivotally coupled to the business card input tray 17. The business card pick-up roller shaft 184 is sheathed by the business card pick-up roller 181 and inserted into the position-limiting glide slot 174 of the business card input tray 17. The relationship between the business card pick-up roller assembly 18 and the business card input tray 17 are described as above. That is, the business card pick-up roller assembly 18 is fixed on the business card input tray 17 by means of the shaft rod 183 and the business card pick-up roller shaft 184. Moreover, since the shaft rod 183 is pivotally coupled to the business card input tray 17, the business card input tray 17 may be rotated with respect to the shaft rod 183 to be located in either a feeding position or a retracting position. For scanning the business cards by the sheet-feeding scanning apparatus 1, the business card input tray 17 is rotated to the feeding position such that the business card pick-up roller shaft 184 is located in a first position of the position-limiting glide slot 174, as is shown in FIG. 3. Whereas, for scanning the ordinary documents by the sheet-feeding scanning apparatus 1, the business card input tray 17 is rotated to the retracting position such that the business card pick-up roller shaft 184 is located in a second position of the position-limiting glide slot 174, as is shown in FIG. 4.

The procedure of feeding the business cards by the sheet-feeding scanning apparatus 1 will be illustrated with reference to FIGS. 1 and 3. In a case that the sheet-feeding scanning apparatus 1 is operated in a business card scanning mode, the business card input tray 17 is in the feeding position and the business card pick-up roller shaft 184 is located in the first position of the position-limiting glide slot 174. Next, the business cards to be scanned by the sheet-feeding scanning apparatus 1 are placed on the business card support plate 171 of the business card input tray 17. During the business cards are placed on the business card support plate 171, the user may press down the business card support plate 171 so as to compress the spring 172 under the business card support plate 171. Consequently, a gap is defined between the business card support plate 171 and the business card pick-up roller assembly 18 to accommodate the business cards. Due to the elastic force of the spring 172, the business cards to be scanned are clamped between the business card support plate 171 and the business card pick-up roller assembly 18.

For scanning the business cards, the business cards on the business card input tray 17 are one by one fed into the transfer channel 15 by the business card pick-up roller assembly 18. That is, the business cards contacted with the business card pick-up roller 181 are fed by the business card pick-up roller 181. When the business card separation roller 182 is contacted with the business cards, a friction force generated by the business card separation roller 182 and the separation slice 173 is exerted on the business cards such that only one business card is fed into the transfer channel 15 for each time. After the first business card is fed into the transfer channel 15, the first business card is transported to the scan region 11 by the transfer rollers 16 arranged in the transfer channel 15. When the first business card is transported across the scan region 11, the scanning module 10 reads the image of the first business card. After the first business card is scanned by the scanning module 10, the first business card is transported by the transfer roller 16 which is arranged between the scan region 11 and the ejecting tray 14 to the ejecting roller assembly 19. Meanwhile, the scanning operation on the first business card is completed.

On the other hand, after the first business card is fed into the transfer channel 15, the overall thickness of is reduced. Meanwhile, the remaindering business cards placed on the business card support plate 171 are also clamped between the business card support plate 171 and the business card pick-up roller assembly 18 due to the elastic force of the spring 172. Consequently, the business cards are continuously contacted with the business card pick-up roller 181 and the second business card is fed by the business card pick-up roller 181.

In a case that the sheet-feeding scanning apparatus 1 is operated in an ordinary document scanning mode, the business card input tray 17 is in the retracting position and the business card pick-up roller shaft 184 is located in the first position of the position-limiting glide slot 174, as is shown in FIG. 4.

From the above description, since the sheet-feeding scanning apparatus of the present invention has a business card feeding mechanism, the sheet-feeding scanning apparatus can scan not only ordinary documents but also business cards. That is, the sheet-feeding scanning apparatus of the present invention can be used to scan ordinary documents or business cards. Since many business cards can be successively fed and scanned as electronic files by the sheet-feeding scanning apparatus of the present invention, the scanning speed is enhanced and the information associated with the business cards is effectively managed. The function of feeding the ordinary document or the business card is selectively implemented by changing the position of the business card input tray so that the operation of the sheet-feeding scanning apparatus of the present invention is very convenient.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet-feeding scanning apparatus having a business card feeding mechanism, said sheet-feeding scanning apparatus being adapted for scanning images of multiple ordinary documents or multiple business cards and comprising:

a scanning module disposed within a scan region for scanning said images of said ordinary documents or said business cards;

an ordinary document input tray arranged at one side of said scanning module for placing said ordinary documents thereon;

an ordinary document pick-up roller assembly for feeding said ordinary documents on said ordinary document input tray into an internal portion of said sheet-feeding scanning apparatus;

a transfer channel arranged between said ordinary document input tray and said scan region for leading said ordinary documents;

a plurality of transfer rollers for transporting said ordinary documents;

an ejecting tray for supporting said ordinary documents or said business cards after being scanned;

an ejecting roller assembly for transporting said ordinary documents or said business cards to said ejecting tray;

a business card input tray arranged at another side of said scanning module, and comprising a business card support plate for placing said business cards thereon, a separation slice, and a spring disposed under said business card support plate for exerting an elastic force on said business card support plate; and a business card pick-up roller assembly fixed on said business card input tray for feeding said business cards on said business card input tray, said business card pick-up roller assembly comprising:

a business card separation roller adjacent said separation slice, wherein said business card separation roller further comprises a shaft rod which is directly and pivotally coupled to said business card input tray, so that said business card input tray is rotated with respect to said shaft rod to be located in either a feeding position or a retracting position; and a business card pick-up roller adjacent said business card input tray for feeding said business cards into said transfer channel, wherein said business card pick-up roller assembly further comprises a business card pick-up roller shaft, and said business card pick-up roller shaft is sheathed by said business card pick-up roller and is directly coupled to said business card input tray, wherein an elastic force is exerted on said business card support plate when said business cards are placed on said business card support plate of said business card input tray, so that said business cards are clamped between said business card support plate and said business card pick-up roller and when said business card separation roller is contacted with said business cards, a friction force generated by said business card separation roller and said separation slice is exerted on said business cards such that only one of said business cards is fed into said transfer channel by said business card pick-up roller assembly for each time.

2. The sheet-feeding scanning apparatus having a business card feeding mechanism according to claim 1 wherein said business card pick-up roller shaft is inserted into said position-limiting glide slot, wherein said business card pick-up roller shaft is located in a first position of said position-limiting glide slot when said business card input tray is located in said feeding position, and said business card pick-up roller shaft is located in a second position of said position-limiting glide slot when said business card input tray is located in said retracting position.

* * * * *